United States Patent
Regipa

[11] 3,844,867
[45] Oct. 29, 1974

[54] PROCESS FOR HOT-WELDING A STRIP ON A FILM

[75] Inventor: Robert Regipa, Toulouse, France

[73] Assignee: Centre National D'Etudes Spatiales, Paris, France

[22] Filed: Mar. 13, 1972

[21] Appl. No.: 234,056

[30] Foreign Application Priority Data
Apr. 9, 1971  France.............................. 71.12660

[52] U.S. Cl.................... 156/270, 156/282, 156/324
[51] Int. Cl......................... B32b 31/18, B32b 31/24
[58] Field of Search........... 156/248, 254, 267, 269, 156/270, 282, 311, 322, 324, 498, 499, 543, 545, 290

[56] References Cited
UNITED STATES PATENTS
3,519,515   7/1970   Jennings............................ 156/311
3,539,428   12/1970  James................................ 156/290

Primary Examiner—Charles E. Van Horn
Assistant Examiner—Caleb Weston

[57] ABSTRACT

A hot-welding process which makes it possible to obtain a weld of any desired depth in each zone of the welded elements. The strip used consists of at least two superimposed thicknesses, one made of a hot-welding material having a fusion temperature of the same order as that of the film, and the other being made of a support material having a higher fusion temperature. The process comprises the steps of heating a section of the strip to a temperature between the fusion temperature of the hot-welding material of which it is made and that of the support material, transferring this section to the film, applying the fusion face of the strip to the film, and simultaneously producing differential cooling of the materials. These operations are then reproduced on an adjacent section of the strip, until the latter has been welded along its entire length.

2 Claims, 5 Drawing Figures

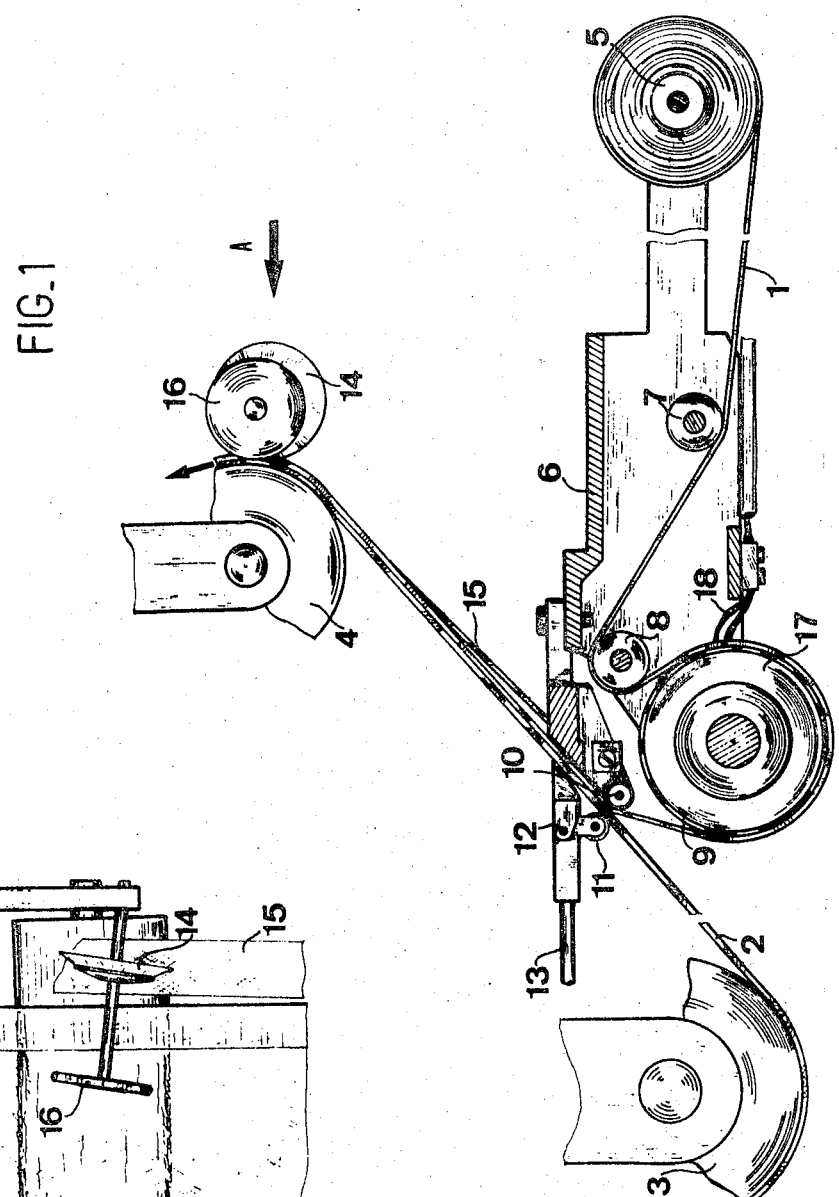

PROCESS FOR HOT-WELDING A STRIP ON A FILM

This invention relates to a process for hot-welding a strip to a film and to an apparatus for carrying out this process; furthermore, the invention refers to an embodiment of this apparatus making it possible to reinforce and cut off one edge of the film.

Generally, in the packing industry using synthetic films and in other applications of synthetic film techniques, for example space balloons, a strip is actually hot-welded to a film by bringing these elements to their fusion temperature and placing them together whereupon cooling is carried out naturally in ambient air or artificially by means of a cooling device provided for the purpose. In practice, hot-welding of this kind is carried out by applying the film to the strip on a heating element over a given period of time.

In order to obtain a good quality well, the time during which the strip and the film remain on the heating element must be accurately regulated, since any variations in this parameter result in changes in the quality of the weld and sometimes in the characteristics of the materials. Thus excessive exposure to the heat causes undue fusion of the materials which may affect their molecular distribution and their strength and resiliency. Accurate regulation of the period during which heat is applied is a delicate operation requiring costly devices, especially since it is necessary to reduce accidental variations to relatively very low values.

Moreover, this conventional process cannot produce welds of varying characteristics adaptable to particular zones: the weld is normally homogeneous, and any variations in the characteristics thereof are purely accidental and cannot be controlled. Now, as will be seen in connection with the application described hereinafter, it is often of interest to be able to obtain a weld adapted to a particular zone and, if necessary, of a nature different from another zone. For example it was found that the adhesion of a strip welded to a film was improved when the thickness of the film affected by the weld decreased progressively to the edges of the strip; and, it was found advantageous for the strip to have a short unwelded portion joined to the film merely by the effect of surface tension. The explanation of this may be that, on the one hand, this short floating portion acts as a damper to tearing stresses which must overcome the forces of surface tension before attacking the weld directly or, on the other hand, that these stresses are applied at a point where the thickness affected by the weld is increasing, producing simple detachments of molecules with no clear line of rupture.

Furthermore, as already stated, fusing a synthetic material alters its molecular distribution and may affect its strength; it is therefore of advantage if, at the edges of the weld, the thickness of the film, the strength of which is not affected by the welding operation, increases progressively, while the thickness on which the weld is effected decreases.

It is an object of the present invention to provide a hot-welding process which makes it possible to obtain a weld of any desired depth in each zone of the welded elements. In order to accomplish this, the strip used consists of at least two superimposed thicknesses, one made of a hot-welding material having a fusion temperature of the same order as that of the film, whereas the other is made of a support material having a higher fusion temperature. The process according to the invention comprises heating a section of the strip to a temperature between the fusion temperature of the hot-welding material of which it is made and that of the support material, transferring this section, which has thus stored up a specific quantity of heat, to the film, applying the fusion face of the strip to the film, and simultaneously producing differential cooling of the materials. The intensity of this cooling is controlled to a value which is a function of the affected zone, so that in each zone the strip transmits to the film a metered quantity of heat in order to produce a weld having specific characteristics capable of varying from one zone to another. These operations are then reproduced on an adjacent section of the strip, until the latter has been welded along its entire length.

The characteristics of the weld obtained by a process of this kind are independent of the time during which the strip is heated, as long as the time is sufficient for the heated parts to reach the equilibrium temperature between the fusion temperature of the hot-welding material of the strip and that of the support material. Under these conditions, the heat transported per surface unit of such a strip is, in fact, independent of time, since it is simply proportional to the thickness of the strip and to the temperature to which the latter is raised. When the heated strip is applied to the film, taking a certain amount of heat from each zone makes it possible to vary the amount of heat transmitted to the film: under the action of this metered heating, the film melts at varying depths, depending upon the zones involved. Thus, by appropriately regulating the cooling means, a weld is obtained which affects in each zone a predetermined thickness of film, which is independent of the time of application and which, especially in the case of a continuous process, is independent of the velocity of travel of the film.

According to one preferred embodiment, the aforesaid differential cooling is limited to a negligible value in the heart of the strip over an important part of the width thereof, increasing progressively in a zone located in the vicinity of one of the edges thereof. In the corresponding zone in the film, the depth of the weld will therefore be decreasing, whereas of course, correlatively, the thickness of the film not affected by the weld will be increasing. This produces a sort of resilient boxing-in of the strip which, as already indicated, is highly favourable to the shear strength of the weld.

Furthermore, in those zones in which the depth of the weld is decreasing, the decrease in thickness of the film, under the action of the pressure exerted when the strip is applied, is reduced in relation to the decrease in thickness of the other zones since, at the moment of application, the compressed thickness of the fused material was lessened in relation to that in the other zones: this characteristic limits the reduction in strength of these areas which, being located at the edges, are more often subjected to the highest shear stresses.

The above-mentioned cooling may be regulated, in order to produce, over a narrow width adjacent the edge of the strip, a temperature drop such that the hot-welding material is at a temperature below its fusion temperature. In this case, no welding takes place over this width; the materials adhere together merely by reason of surface tension. This unwelded part acts as a damper against stresses which have to overcome these surface tensions before attacking the actual weld.

The invention also relates to a device for hot-welding a strip, as described above, to a film; this device is intended to carry out continuously the process according to the invention. To this end it comprises means for guiding the film, together with means for moving it along by traction, means for guiding the strip and for bringing it into proximity with the film, an applicator adapted to apply the strip to the film at a predetermined pressure; according to the invention, heating means are arranged in the path of the strip in an area located slightly upstream of the applicator, for the purpose of bringing the strip to a predetermined temperature, while the applicator is associated with cooling means adapted to remove at each instant a specific quantity of heat from the transverse section of the strip in contact with the said applicator. These cooling means are provided to vary, in each zone in this part, the quantity of heat removed as a function of the depth of weld to be obtained.

According to one form of execution, the applicator consists of a roller rotating about its axis; it comprises a heat-insulated cylindrical portion and, along at least one edge thereof, a conducting part having a hollow core pierced by fine calibrated ducts. This applicator is also provided with means of attachment to a source of cooling fluid to promote a circulation of cooling fluid and the hollow core a fine calibrated ducts mentioned above.

The means for heating the strip may be of any desired type; they are arranged in the path of the strip, upstream of the applicator and at a short distance therefrom, so that heat losses between the heating means and the applicator are negligeable. The said heating means may consist, very simply of a roller rotating about its axis, with an internal heating resistance capable of raising its periphery to a specific temperature; this resistance is electrically connected to two conducting tracks located on the sides of the roller, brushes supplying electric power resting resiliently against the said conducting tracks. Automatic adjustment of the temperature to the desired value is effected by control means associated with the said resistance.

The invention furthermore covers a device which, once the strip has been welded to the film, cuts the said film along a line coinciding with one of the edges of the said strip; according to the invention, this device comprises, downstream of the applicator, two units forming along the path of the film guide paths diverging from each other at the level of the edge of the welded strip along which the film is to be cut. These guide paths impart to the two parts of the film (one on one side of the said edge, the other on the other side) directions of movement which diverge in a longitudinal plane perpendicular to the plane of the film. A sharp guiding edge approximately perpendicular to the plane of the film is also arranged between the applicator and the aforesaid guide units: when the device is started up, this edge starts a cut in the film and this extends in a natural manner as the film moves onwards and as the two parts are moved away from each other by the diverging guide units.

A device of this kind has the advantage of being able to cut very long lengths of film without appreciable wear of the sharp edge, which comes into use only when the device is started up.

Downstream of the said guide units, the device is completed with means for carrying along the cut end; these means consist of a roller, the plane of rotation of which is at a slight angle to the direction of movement of the film, in order to remove the end from the latter and eliminate it. This roller grips the end between itself and a guide roller and is driven by another roller mounted on the same shaft and slightly smaller in diameter; the latter roller is in contact with the film and is caused to rotate by the movement thereof. Since it is slightly larger in diameter than the aforesaid co-axial roller, the roller which carries the end along subjects it to a tension slightly higher than that applied to the film itself; this additional tension prevents the said end from becoming slack, which might alter the quality of the cut.

According to one form of embodiment which makes it possible to edge and cut the film along a line varying in shape, the strip guide means, the applicator and its cooling means, together with the heating means, are united into a compact unit; also included in this unit are the means for feeding the strip. This unit is arranged to move parallel with the transverse direction of the film and may have a controlled transverse movement imparted to it, for the purpose of producing a reinforced edge having a given profile.

The invention having now been described in a general way, the description which follows presents, by way of a nonrestrictive example, a form of embodiment thereof as illustrated in the drawing, wherein:

FIG. 1 is a view, in axial section, of a hotwelding and cutting device according to the invention;

FIG. 2 is a detail view as seen from A of the device for carrying along the end after it has been cut;

The device, presented by way of example, is intended to attach a strip 1 to a film 2 and to cut the product obtained along one edge of the strip. It thus makes it possible to obtain elements of a predetermined shape with reinforced edges which make them easy to manipulate and reduce the risk of tearing. In the example selected, these elements are spherical lunes from which spheroidal stratospheric ballons are produced, known as natural shapes. In this particular example, the film is made of 20 microns polyethylene, whereas strip 1 is made of three thicknesses: one piece of polyester about 13 microns thick arranged between two pieces of polyethylene about 20 microns thick. The film is available in the form of a roll between two and three metres in width, which is unrolled by means of a traction drive, not shown; during its travel, the film is guided by rollers such as 3 and 4.

Reinforcing strip 1 is available in the form of a roll 5 free to rotate on a frame 6 which carries the assembly and cutting means of the device. This strip is approximately two to three centimetres in width.

Figure 3:
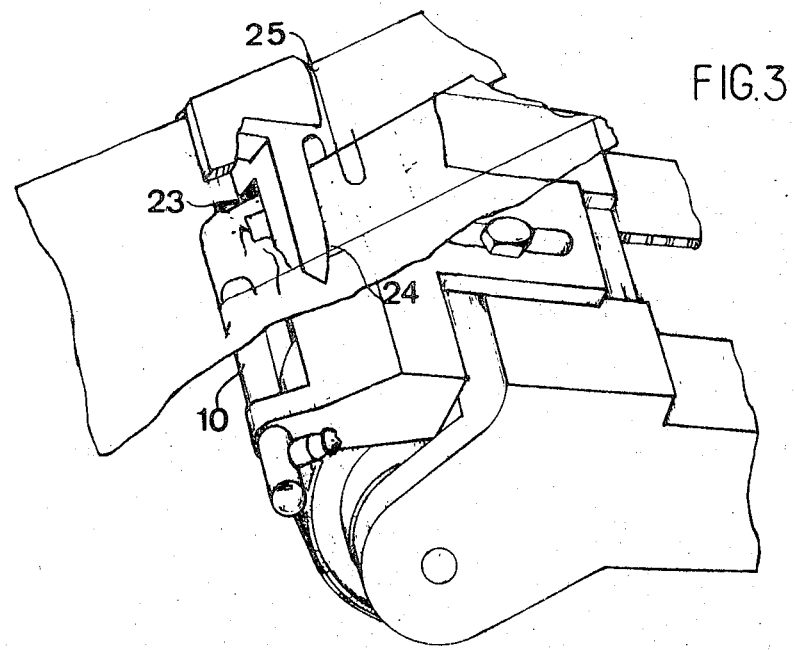
FIG. 3 is a partial view of the device.

Strip 1 is guided by rollers 7 and 8 which bring it into contact with a heating roller 9; downstream of this roller, and in the vicinity thereof, is an applicator 10, the structure of which will be described in detail in connection with FIG. 4. The film is guided by rollers 3 and 4 by means of which it is brought into contact with strip 1 on a level with applicator 10. A back-up applicator 11, hinged at 12 to frame 6 and equipped with an operating lever 13, may rest upon the film and apply slight pressure to the film and the strip. Immediately upstream of applicator 10, cutting means (described in detail in connection with FIG. 3) cut the film, as it travels, along one edge of the strip which has just been assembled to it.

Moreover, a flexible roller having a conical skirt 14 (FIG. 2) exerts traction on cut end 15. This roller is mounted on the same shaft as another roller 16 of slightly smaller diameter which rests on the film in the vicinity of roller 4 and is therefore caused to rotate as the said film travels. The shaft of rollers 14 and 16 is at a slight angle to the transverse direction of the film, as shown in FIG. 2, so that roller 14, which is caused to rotate by roller 16 as the film travels, exerts a lateral releasing force on the cut end which tends to separate it from the film. Furthermore, any possibility of the end accidentally moving back towards the film is eliminated by roller 14 by reason of its conical shape which restrains the said end laterally. Moreover, in the example illustrated, heating roller 9 carries a resistance 17 in the form of a sleeve, collector brushes being arranged to rub against the other surfaces of the said roller. These brushes are connected to a source of electricity by leads 18; a control unit for the power supply (of conventional type, not shown in the drawings) makes it possible to set the temperature of resistance 17 to a constant adjustable value. For the materials mentioned above by way of example, this value is of the order of 150° C. a temperature at which polyethylene is in fusion; the polyester starts to fuse only at 170° C.

Thus, upon leaving the heating roller 9, strip 1 consists of one thickness of polyester, heated but not in fusion, supporting two layers of polyethylene in fusion. The quantity of heat transported per unit of surface area between roller 9 and applicator 10 by strip 1 is proportional to its temperature and thickness; it is independent of time and therefore of the velocity of travel of strip 1 and film 2, since the duration of the contact between the strip and the heating roller is enough to allow the said strip to assume the temperature of the roller.

Upon making contact with the film at the level of applicator 10 and back-up roller 11, the strip releases to the film — over a very short period of time — a portion of the heat stored therein, causing the film to fuse to a certain depth, this depth depending upon appropriate control of the heat stored by the strip; if the thickness of the latter is constant, this control will be accomplished by varying the temperature of the heating roller 9. Since, as already stated, the heat stored is independent of time, variations in the velocity of travel of the film will have no effect upon the thickness of the material in fusion in the film.

Moreover, this thickness of material in fusion may be varied and modified according to the particular zone in the strip. Applicator 10 (FIG. 4) actually consists of a cylindrical part 19 made of teflon or some other insulating material, and of a hollow core 20 made of a conducting metal. This part 20 is pierced with small calibrated ducts 21 which connect the core to the periphery and may be fed with cooling gas through a conduit 22.

Thus almost no heat is removed from the part of the film in contact with insulating part 20, except for a small, progressively increasing amount in the vicinity of cooled part 20; in this cooled part, on the contrary, the amount of heat removed increases as the distance from insulating part 19 increases. This removal of heat may be adjusted by appropriate control either of the temperature or of the flow of cooling gas.

Figure 4:
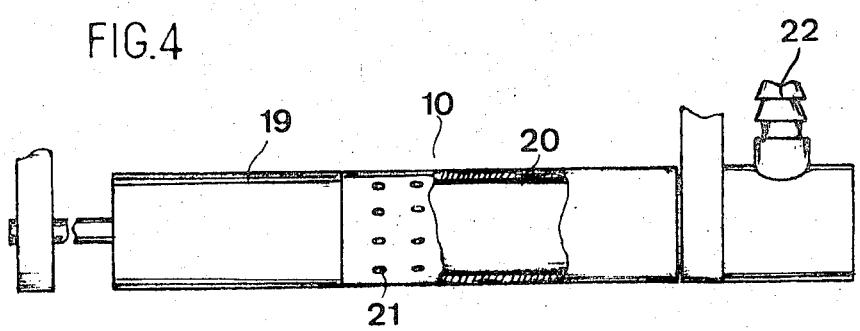
FIG. 4 is a view of the applicator on which assembly takes place.
Figure 5:
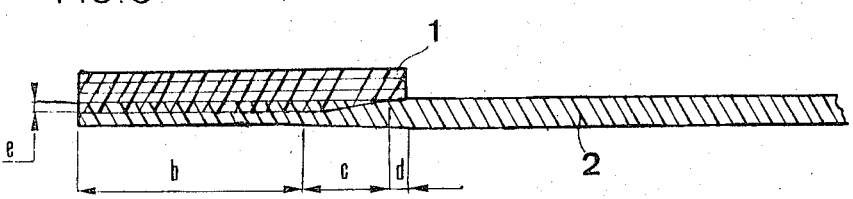
FIG. 5 is a schematic section of a film and a strip assembled and cut by means of a device according to the invention.

FIG. 5 is a schematic illustration, in accordance with the applicator in FIG. 4, of strip 1 welded to film 2. Over a width "$b$," since the amount of heat removed was negligeable, the depth "$e$" of the weld (corresponding to the thickness of polyethylene which entered into fusion on the film) is constant. Over a width "$c$," since the removal of heat was increasing until it produced a temperature equal to the temperature at the start of fusion of the polyethylene, the depth of the weld decreases until it disappears. Beyond this zone, the material was no longer in fusion, and the two elements were not welded together but merely joined together by the action of surface tension.

The applicator described by way of example therefore makes it possible to obtain differential welding affecting a depth of film which is constant over a large part of the strip, and a depth which decreases and then becomes zero on one edge; a weld of this kind constitutes a sort of progressive boxing-in of the strip on the film, which produces excellent holding properties from the point of view of shear stresses.

It is to be understood that the design of the applicator is adapted to produce a weld possessing improved holding qualities under the conditions in which it will be called upon to operate. In the case of a strip welded to the middle of a film, the applicator could have two cooling zones, one on each side of an insulating zone, in order to produce a weld which decreases in depth on each side of the strip.

Immediately downstream of applicator 10 is a blade 23 (FIG. 3) located to the right of the edge of the applicator; behind this blade and on each side of it are guiding surfaces defining diverging paths 24, 25. When the apparatus is set in motion, blade 23 is called upon to start a tear along the cutting line; this tear is then propagated as the film advances, as a result of the spreading apart of the two pieces by paths 24, 25. Wear on blade 23 is very slight since, in contrast to known devices, it only starts the cut; when the apparatus is in operation, the cut proceeds naturally since the parts cut (the end and the film) are pulled in diverging directions.

As has already been seen, end 15 is carried along by roller 14 which, being slightly larger in diameter than roller 16, exerts a slight but constant tension on the said edge. This tension prevents the edge from sagging, which would affect the regularity of the cut obtained.

Although the invention has been described above in relation to a specific form of the invention, it will be understood that it may refined and modified in various ways. It is therefore wished to have it understood that the present invention is not limited in interpretation except by the terms of the following claims.

What is claimed is:

1. A process for hot-welding a strip to a film, said strip consisting of at least two superimposed layers, one layer being made of a hot-welding material having a specific fusion temperature and the other layer being a support material having a higher fusion temperature, said film consisting of a single layer of hot-welding material having a fusion temperature of the same order as that of the hot-welding material of the strip, said process consisting of the steps of heating a section of said strip; conveying said heated section toward said film for lamination therewith; cooling said heated section prior to lamination with said film; applying a fusion face of said heated section to said film; and reproducing the above steps on an adjacent section of said strip and film; said process being characterized in that the intensity of heating of the section of strip is controlled by raising said heating to a temperature between the temperature of fusion of its hot-welding material and that of its support material, the fusion face of said adjacent section of the strip being applied to an unrolled piece of film in a zone where said film is stretched and is not superimposed on other pieces of film, the cooling thereof consisting of a differential cooling varying in intensity over the width of the strip, said intensity being limited to a low value in the central zone of said strip and increasing progressively towards one edge thereof until it reaches a value producing a drop in temperature such that the highest temperature of the hot-welding material is equal to its lower fusion limit, in such a manner that the depth of film welded to the strip is a maximum and is substantially constant in the central zone of the strip and decreases progressively towards the edge thereof, until it reaches zero welding depth and the strip is merely joined to the film.

2. A hot-welding process according to claim 1, characterized in that the zone of the strip located in the vicinity of the other edge, said edge being opposite the edge subjected to cooling of increasing intensity, is subjected to a negligible amount of cooling, so that the quantity of heat contributed by this zone of the strip to the corresponding part of the film produces fusion to a considerable depth in this part of the film, the latter being cut at the edge of the said strip by the application of a slight spreading force to the parts of the film located on each side of the edge of the strip.

* * * * *